Sept. 22, 1970   E. V. GAUTHIER   3,529,469
FLOWMETER FOR LIQUID FUEL ENGINE
Filed April 12, 1968

INVENTOR
EDWARD V. GAUTHIER

BY Nilsson + Robbins
ATTORNEYS

United States Patent Office 3,529,469
Patented Sept. 22, 1970

3,529,469
FLOWMETER FOR LIQUID FUEL ENGINE
Edward V. Gauthier, 9351 Mokihana Drive,
Huntington Beach, Calif. 92646
Continuation-in-part of application Ser. No. 469,494,
July 6, 1965. This application Apr. 12, 1968, Ser.
No. 727,131
Int. Cl. G01m 15/00
U.S. Cl. 73—113                                    6 Claims

ABSTRACT OF THE DISCLOSURE

The flowmeter is disclosed for indicating fuel consumption as by an internal-combustion engine. The system, as disclosed is applied to engines wherein liquid fuel is supplied from a float-chamber fuel reservoir to be atomized as it is drawn through a carburetor throat to the engine combusion chambers. The differential pressure existing between the float-chamber reservoir and the carburetor throat is sensed as an indication of the rate of fuel consumption. The flowmeter is disclosed on power plants having a plurality of carburetor throats or channels, e.g. multi-engine power plants and multi-barrel carburetors. In such systems, individual pressure signals are individually sensed and applied to yieldable members, the total combined displacement of which is sensed by a summing structure to provide a single output to an indicator. The yieldable members are spring biased by spring means incorporating calibration set screws.

BACKGROUND AND SUMMARY OF THE INVENTION

An indication of the rate at which fuel is being consumed by a vehicle may be a significant consideration in operating the vehicle. In this regard, an indication of fuel consumption may be provided in terms of a rate-of-flow. Additionally, the flow rate may be related to the speed of the vehicle and thus indicated in terms of fuel consumption per unit of distance, as disclosed in applicant's copending U.S. Pat. application, Ser. No. 469,494; entitled Integrated Meter System and filed July 6, 1965, and now U.S. Pat. 3,405,554, of which the present application is a continuation-in-part.

The difficulty of indicating rates of fuel consumption for an internal combustion engine is substantially compounded if the power plant incorporates several carburetors or at least one multi-barreled carburetor. A similar difficulty also arises in situations in which several engines constitute the power plant. In general, various instrumentation systems of the prior art have been utilized which provide separate indications for each independent engine. However, with regard to fuel consumption, such an instrumentation system would require the observer to additively combine the separate indications in order to arrive at the total fuel consumption which is normally the information of primary interest. Additionally, independent indicators are quite expensive and occupy additional space on an instrument panel, which is sometimes quite limited.

In general, the system of the present invention is applicable either to multi-engine power plants or to power plants utilizing carburetors having a plurality of barrels or fuel-intake channels. The system senses the critical pressure differentials for each of the separate fluid-flow channels and employs such differentials to physically position displaceable means, the separate displacements of which are summarized by a structure to drive an indicator manifesting total fluid flow.

BRIEF DESCRIPTION OF THE DRAWINGS

In the drawings, which constitute a part of this specification, an exemplary embodiment demonstrating various objectives and features hereof as set forth, specifically.

DESCRIPTION OF THE ILLUSTRATIVE EMBODIMENTS

As required, detailed illustrative embodiments of the invention are disclosed herein. It is to be understood that these embodiments exemplify the invention. Therefore, specific structural and functional details disclosed herein are provided as a basis for the claims defining the scope of the invention.

Figure 1:
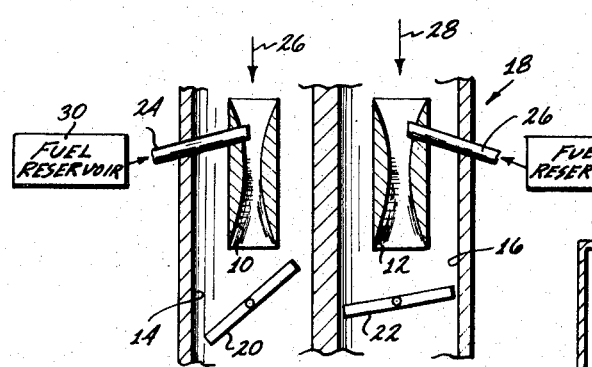
FIG. 1 is a diagrammatic view illustrating certain principles of the present invention.

Referring to the diagram of FIG. 1, there is represented a pair of venturis 10 and 12 positioned in separate channels 14 and 16 respectively of a carburetor 18. The channels 14 and 16 may actually comprise two throats of any of a variety of multi-barreled carburetors. Throttle valves 20 and 22 are piovtally affixed in the channels 14 and 16 respectively to control the fuel flow therethrough.

In the operation of the carburation system as represented in FIG. 1, air flow through the venturis 10 and 12 develop a reduced pressure, which draws fuel from reservoirs 30 and 32, through jets 24 and 26 respectively. In passing from the jets 24 and 26, fuel is atomized in the air streams indicated by the arrows 26 and 28. The jets 24 and 26 are actually connected to float chambers (not shown) represented by the fuel supply reservoirs 30 and 32 respectively. The fuel drawn through the jets 24 and 26 to be atomized within the venturis 10 and 12 is then supplied to combustion chambers (not shown) and ignited.

In the operation of a fuel system as represented in FIG. 1, the venturi or venturis (as venturis 10 and 12 in FIG. 1) may be effectively operated over only a limited range of air flow velocity and still satisfactorily perform the function of relating mass air-flow to rate-of-fuel flow. That is, at low velocities the venturi may not develop an adequate pressure differential to atomize the liquid fuel and at high intake velocities the venturi may become too restrictive of air flow. To solve this problem, the prior art has utilized plural carburetors and plural-barreled (plural venturi) carburetors. For example, according to one arrangement several channels are provided through a carburetor as shown in FIG. 1, one of which provides the primary flow while the other serves as a secondary. Specifically, the throttle valve 20 as shown in FIG. 1 controls the fluid flow through the channel 14 during relatively-low speed operation. During such operating intervals the throttle valve 22 remains completely closed. However, to operate the associated engine at high speeds, the throttle valve 22 is opened thereby enabling a considerable increase in air flow while continuing to meter the fuel intake.

In considering the rate of fuel flow through the channels 14 and 16, it is apparent that the fuel flow rates in the two separate channels are not reliably related. As a result, to obtain a measurement of total fuel flow, the flow through the channel 14 must be added to the flow through the channel 16. In this regard, the fuel flow through each of the channels is related to the pressure differential between the inside of the venturis and the reservoirs 30 and 32 containing liquid fuel. That is, the fuel flow through each of the channels 14 and 16 is related to the pressure differential across the jets 24 and 26. Accordingly, the present invention incorporates structure to sense such pressure differentials and may also incorporate means for summing the individual pressure signals, and for displacing an indicator accordingly.

Figure 2:
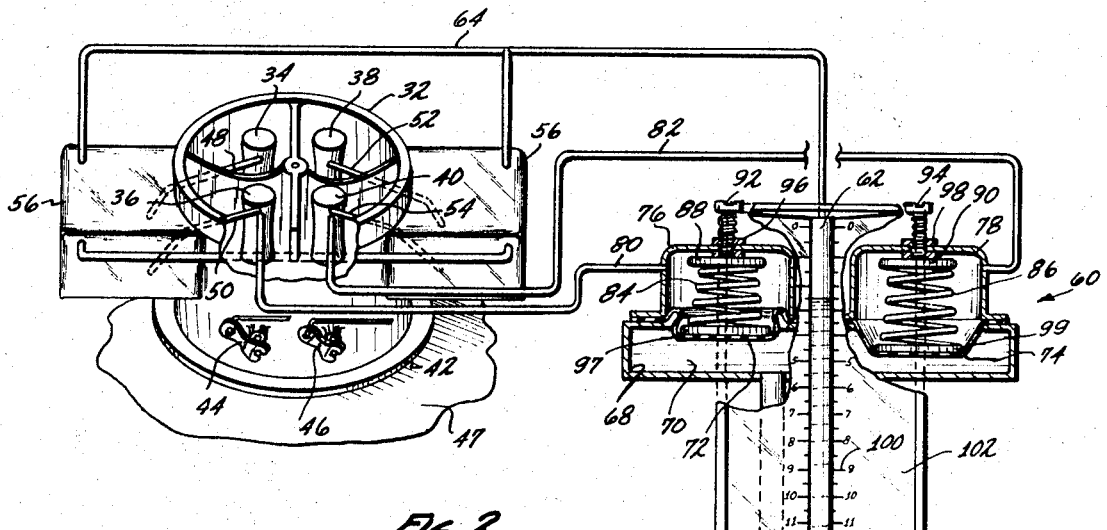
FIG. 2 is a diagrammatic view illustrating one embodiment of the present invention.

Considering a structural embodiment hereof in greater detail, a carburetor of the type diagrammatically represented in FIG. 1, is shown in perspective by FIG. 2 embodied as a four-barrel unit 32. Specifically, four barrels or venturis 34, 36, 38 and 40 are shown in FIG. 2 which are supported and mounted as well known in the prior art within a carburetor housing 42. The venturis 34 and 36 are the primary units and supply fuel during low-speed operation of the associated engine 47 (fragmentarily represented). However, during high-speed operation, the venturis 38 and 40 also open, to supply additional fuel and air to the engine 47.

The venturis are controlled in pairs by throttle valves as depicted in FIG. 1, which in turn are controlled by accelerator linkages 44 and 46. Specifically, the linkage 44 controls a pair of similarly-oriented throttle valves (not shown) pivotally mounted beneath the venturis 34 and 36 while the linkage 46 similarly controls throttle valves (not shown) positioned below the venturis 38 and 40. The latter venturis 38 and 40 operate only at high-speeds of the engine 47.

The venturis 34, 36, 38 and 40 are supplied fuel through jets 48, 50, 52 and 54 respectively which extend from the venturis to float chambers 56, which structures comprise the fuel reservoirs from which fuel is drawn to be atomized and which structures are very well known in the prior art. In accordance with techniques of the prior art the float chambers 56 are supplied with fuel through a fuel pump, on demand and may be vented to the carburetor air intake through a ram vent, as well as being vented to ambient air pressure, as disclosed in the above-referenced copending application. As a result, the pressure in the chambers 56 varies considerably with engine operation and environment.

In the operation of the system, the venturis 34 and 36 are similarly throttled as a pair, as are the venturis 38 and 40. Therefore, the pressure differential between the interior of the venturi 36 and the interior of the associated float chamber 56 is indicative of the fluid flow through both the venturis 34 and 36. A similar consideration applies with respect to the venturis 38 and 40. As a result, the venturis 36 and 40 are sensed to provide a proportionate indication of the total fuel flow through the carburetor. In this regard, the indication is accomplished by a liquid-column indicator 58 which is driven by a structure generally indicated at 60.

The fluid-column indicator 58 has its upper end 62 connected through a pressure duct 64 to both of the float chambers 56. The lower portion of the indicator 58 is returned through a small fluid duct 66 to a fluid chamber 68. The indicator 58 along with the duct 66 and the chamber 68 are all filled with metering fluid 70, e.g. various forms of extremely stable, colored fluid as well known in the prior art.

The chamber 68 integrates a pair of displaceable diaphragms 72 and 74 as a portion thereof. For example, the diaphragms 72 and 74 may comprise rubber-like sheets affixed to close openings that are otherwise defined in a metal portion of the chamber 68. The upper surfaces of the diaphragms 72 and 74 are exposed to a low pressure signal. Specifically, the upper surfaces of the diaphragms 72 and 74 are covered by sealed bell closures 76 and 78 which are connected respectively through pressure ducts 80 and 82 to the interiors of the venturis 36 and 40 respectively so as to provide a low-pressure signal. Specifically, according to the structure as shown, the diaphragm 72 is subjected to the pressure differential across the jet 50 while the diaphragm 74 is subjected to the pressure differential that is developed across the jet 56. In this regard, the pressure differential that is developed across a jet is identified as the pressure differential between the low-pressure inside the venturi and the higher pressure to which fuel in the float chamber is subjected. Of course, the latter pressure varies widely in accordance with fuel pump performance atmospheric pressure, and so on. The former pressure (venturi pressure) varies in accordance with the same changeable conditions and additionally is varied by the rate of fuel flow. Thus, the present system utilizes a differential signal to accomplish a true indication of fuel flow which is based on pressure, yet which is referenced to accomplish substantial independence from variations in ambient and the like.

Considering the structure of FIG. 2 in still greater detail, coil springs 84 and 86 exert biasing forces on the diaphragms 72 and 74 respectively and are supported by plates 88 and 90 respectively carried on associated set screws 92 and 94. The set screws 92 and 94 are hermetically sealed in the closures 76 and 78 as indicated by seals 96 and 98. Bottom plates 97 and 99 are provided as force transfers between the springs 84 and 86 respectively and the diaphragms 72 and 74.

In view of the above structural description of the system of FIG. 2, a complete understanding thereof may now best be accomplished by assuming certain operational conditions and describing the attendant operations to provide fuel-flow indications. Therefore, assume initially that the engine 47 supplied by the carburetor represented in FIG. 2 is operating at a range of relatively low speeds. As a result, the linkage 46 closes the intake channels containing the venturis 38 and 40; however, the linkage 44 allows varying flows through the venturis 34 and 36 accommodating speed control.

As the flow through the venturi 36 varies, the pressure in the duct 80 varies inversely. Therefore, as the speed of the engine increases and a greater quantity of fuel flows to the engine 47, the pressure drops in the duct 80 as does the pressure inside the closure 76. As a result, the diaphragm 72 raises to a level which is determined by the reduced pressure and balanced by the spring 84. Concurrently, the fluid in the column indicator 58 drops indicating a progressively higher number on a scale 100 which is carried on a mask 102, through which the indicator 58 is displayed.

In the reverse or contrary situation, if the pressure inside the venturi 36 should increase (indicating reduced fuel consumption) the pressure in the duct 80 experiences an attendant increase as does the pressure inside the enclosure 76. As a result, the diaphragm 72 is forced downwardly thereby driving fluid from the chamber 68 through the duct 66 to raise the fluid level in the indicator 58.

At a time when the engine is inoperative the pressure in the venturi 36 is essentially ambient, and is therefore at its highest operating pressure within the enclosure 76. Thereupon the liquid column in the indicator 58 is raised to its highest level, at which "zero" fuel is indicated to be flowing.

During the intervals when the engine is operated at higher speeds, the venturis 38 and 40 are also opened, under control of the throttle linkage 46. The pressure in the venturi 40 drops during such intervals and is applied to the interior of the enclosure 78 through the duct 82. As a result, both the diaphragms 72 and 74 are variously positioned to displace a combined quantity of fluid and thereby manifest a rate of fuel consumption for both venturis 36 and 40 which is fully representative of the total fuel flow or consumption for all four venturis 34, 36, 38 and 40. In this operation, as the fuel flow increases, the venturi pressure drops resulting in attendant drops within the enclosures 76 and 78 thereby enabling the diaphragms 72 and 74 respectively to raise, enlarging the interior space in the chamber 68 to accommodate more fluid from the column in the indicator 58. As a result, progressively higher indications of fuel flow rates are indicated.

In some installations or applications for systems of the present invention, it may be desirable to provide mechanical linkages and a mechanical indicating pointer. Furthermore, it is to be appreciated that the system hereof is fully applicable to power plants utilizing a plurality of separate engines. An embodiment hereof incorporating such structures is shown in FIG. 3 and will now be considered in detail.

Figure 3:
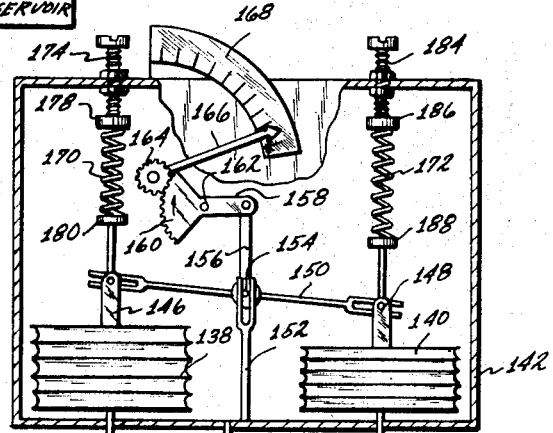
FIG. 3 is a diagrammatic view illustrating another embodiment of the present invention.
Figure 3:
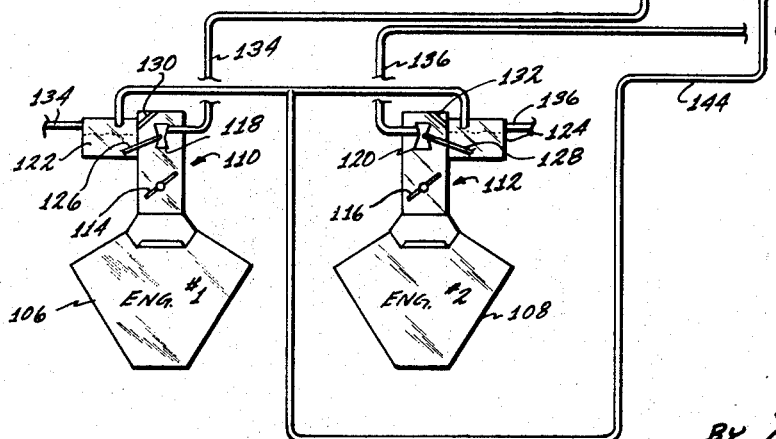

The system of FIG. 3 is applied to a pair of independently-operated engines 106 and 108 (symbolically represented). The first engine 106 incorporates a carburetor 110 while the second engine incorporates a carburetor 112. Both carburetors are diagrammatically represented and incorporate throttle valves 114 and 116 respectively in accordance with well known techniques to control the flow through associated venturis 118 and 120, which accordingly atomize fuel in passing the fuel from float chambers 122 and 124 respectively through jets 126 and 128. The carburetors 110 and 112, as symbolically represented, also include ram ducts 130 and 132 respectively, which vent the interior of the float chambers 122 and 124 as indicated. Of course, also as well known in the prior art the float chambers 122 and 124 are supplied with fuel by a fuel pump (not shown) or otherwise as through ducts 134 and 136.

As indicated above, the specific structure of the carburetors 110 and 112 may vary widely; however, the significant aspect thereof lies in the inclusion of fuel-atomizing structure through which fuel is drawn and in which a pressure is developed that may be referenced to the pressure in the fuel-intake compartment or chamber to provide an indication of fuelflow. That is, the pressure differential between the interior of the venturi 118 and the interior of the flow chamber 122 is a positive indication of fluid flow in accordance herewith.

The pressures in the venturis 118 and 120 are separately applied through ducts 134 and 136 respectively to individual bellows 138 and 140. A housing 142 provides a hermetic seal about the bellows 138 and 140 and is connected through a duct 144 to each of the float chambers 122 and 124. As a result, the exteriors of the bellows 138 and 142 are subjected to the pressure in the float chambers 122 and 124; however, the interiors of the bellows 138 and 142 are subjected respectively to the venturi pressures in the venturis 118 and 120 respectively.

The bellows 138 and 140 carry displaceable load members 146 and 148 respectively which are mechanically coupled to the ends of a floating beam 150 which is supported in a vertical yoke 152 (affixed to the housing 142) so as to afford a floating pivot mount 154. An ertension 156 from the pivot mount 154 is pivotally coupled to a rack arm 158 which is integral with a rack 160, the combination being affixed to the housing 142 by a pivot 162. The rack 160 engages a gear wheel 164 which carries a pointer 166 that is referenced to an accurate scale 168.

The load members 146 and 148 (extending from the bellows 138 and 142 respectively) are affixed in vertical alignment with a pair of coil springs 170 and 172 respectively. Specifically, coil spring 170 is affixed between a set screw 174 and the load member 146 by a pair of load plates 178 and 180. Somewhat similarly, the spring 172 is affixed between a set screw 184 and the load member 148 by load plates 186 and 188.

The operation of the system of FIG. 3 is quite similar to that of FIG. 2. The interior of the enclosure 142 is pressurized at the interior pressure of the float chambers 122 and 124 (near ambient). The interiors of the bellows 138 and 140 are then pressurized in accordance with the pressures in the venturies 118 and 120. As the fuel flow increases through the venturies, the pressure therein drops with the result that the bellows 138 and 142 collapse to displace the load members 146 and 148 accordingly. As the members 146 and 148 are displaced the loading beam 150 summarizes the individual displacements and actuates the rack to drive the pointer 146 through the gear wheels 164 accordingly.

Summarizing the system of FIG. 3 provides structure for sensing a critical pressure differential and additionally discloses application of the system to a power plant having more than one fuel flow path. The system also includes springs to accomplish calibration by means of associated set screws. In this regard, it is to be noted that the described embodiments are not truly manometers in a strict sense, but rather they are operated by a combination of spring and pressure forces. As a result, accurate calibration is a distinct feature hereof.

The system hereof thus affords an inexpensive and economical system for indicating fuel flow (fuel consumption) which is essentially independent of ambient pressures and similar considerations. Additionally, the system may be readily adapted to engines incorporating a plurality of fuel-flow channels. Of course, the structure hereof may take a wide variety of different forms and the scope hereof is therefore to be determined in accordance with the following claims.

What is claimed is:

1. A fuel flowmeter system for a combustion power plant that includes at least one distinct fuel-flow channel for atomized fuel, comprising:
   venturi means affixed in said fuel-flow channel, including means for sensing the fluid pressure in said channel;
   liquid fuel pressure sensing means for sensing the fluid pressure at the location of liquid fuel immediately prior to entry into said channel;
   an indicator means for manifesting fuel flow; and
   an indicator drive means for driving said indicator in accordance with the pressure differential between pressures sensed by said venturi means and said liquid full pressure sensing means.

2. A fuel flowmeter according to claim 1 further including spring means for providing a spring bias force on said indicator drive means.

3. A fuel flowmeter system for a combustion power plant that includes at least two distinct fuel-flow channels for atomized fuel, comprising:
   first and second pressure dfferential sensing means for sensing the pressure differentials between the fluid pressure in each of said fuel flow channels and the fluid pressure of fuel prior to entry into said channels, in the form of physical displacements;
   an indicator means for manifesting fuel flow;
   a pivotally-mounted floating beam having the ends thereof coupled to be displaced by said physical displacements; and
   an indicator drive means for driving said indicator means in accordance with the displacement of a central location on said floating beam.

4. A fuel flowmeter according to claim 3 wherein said first and second pressure differential sensing means each comprise a fluid chamber for integrating said pressures and wherein said indicator means comprises a fluid column means coupled to said fluid chambers.

5. A fluid flow system according to claim 3 further including spring means to resist physical displacement in said first and second pressure differential sensing means.

6. A fluid flow system according to claim 3 further including means to variously position said first and second pressure differential sensing means for calibrating said system.

References Cited

UNITED STATES PATENTS

| | | | |
|---|---|---|---|
| 1,136,634 | 4/1915 | Watres | 177—209 X |
| 2,207,880 | 7/1940 | Skoldberg | 73—114 |
| 2,371,253 | 3/1945 | Moore | 73—195 |
| 2,450,772 | 10/1948 | Watkins | 73—407 |
| 2,697,348 | 12/1954 | Bevins | 73—195 X |
| 3,378,091 | 4/1968 | Caughley | 177—209 |

JERRY W. MYRACLE, Primary Examiner

U.S. Cl. X.R.

73—205